Patented Oct. 24, 1950

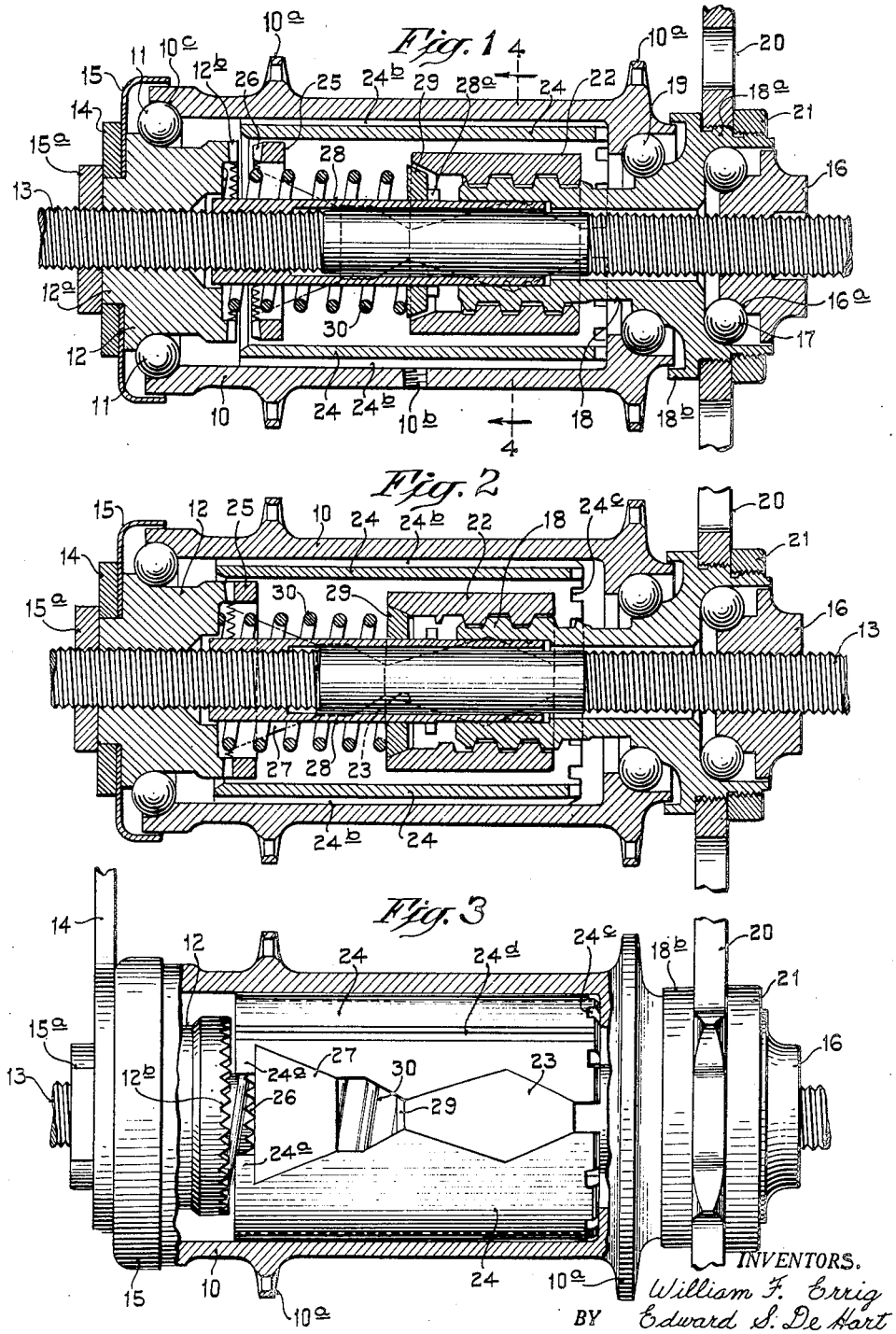

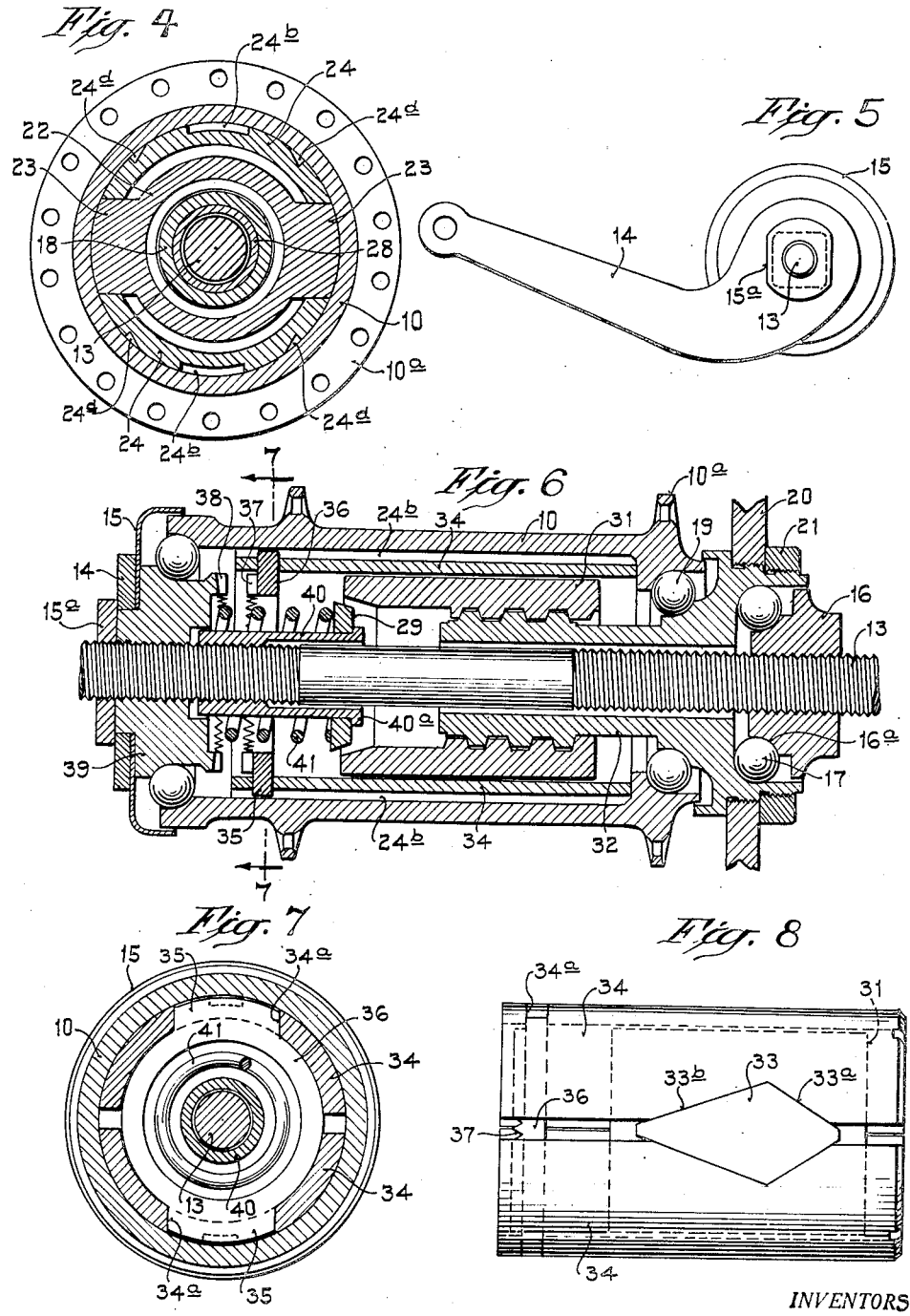

2,527,179

UNITED STATES PATENT OFFICE 2,527,179

TRANSMISSION CONTROL AND BRAKE MECHANISM

William F. Errig and Edward S. De Hart, Philadelphia, Pa., assignors, by mesne assignments, to William F. Errig, trading as Peco Manufacturing Co., Philadelphia, Pa.

Application December 14, 1944, Serial No. 568,095

1 Claim. (Cl. 192—6)

This invention relates to a coaster brake for bicycles, and more particularly to a combined bicycle clutch, free-wheeling and brake mechanism.

One of the objects of the invention is to provide a novel driving hub construction wherein the elements which are employed as brake shoes are also used as clutch shoes.

It has heretofore been proposed to provide devices of the above character wherein the shoes used in braking are also adapted to use as clutch shoes. In all of these prior structures it has been found necessary to surround the shoes with yielding means which constantly tend to prevent radial movement of the shoes into clutch or braking engagement with the inner surface of the hub. Such yielding means are subject to wear and breakage and are expensive to manufacture anad assemble.

An object of the present invention is to provide a simplified construction wherein the common brake and clutch shoes are loosely mounted within the hub and do not require the use of springs or other yielding members to move them out of engagement with the inner surface of the hub.

Other objects include the provision of a bicycle clutch and coaster brake which is inexpensive to manufacture, efficient in operation, and which is particularly adapted for long life.

The above and further objects will appear more fully hereafter in the detailed description which is to be read with the accompanying drawing illustrating two embodiments of the invention. It is to be expressly understood, however, that the drawings are for purposes of illustration only and are not designed to be a definition of the limits of the invention, reference being had for this purpose to the appended claim. Referring to the drawings, wherein like reference characters refer to like parts throughout the several views, Fig. 1 is a longitudinal section illustrating the invention with the elements thereof in clutching position;

Fig. 2 is a view similar to Fig. 1 but illustrating the parts in braking position;

Fig. 3 is a plan view, with a portion of the hub broken away, illustrating the parts in free-wheeling position;

Fig. 4 is a transverse section taken on the line 4—4 of Fig. 1;

Fig. 5 is an end view illustrating the torque arm that may be employed;

Fig. 6 is a longitudinal sectional view of a second embodiment of the invention, with the parts shown in clutch position;

Fig. 7 is a transverse section taken on line 7—7 of Fig. 6, and

Fig. 8 is a side elevation of the brake and clutch shoes and associated elements of Fig. 6 removed from the hub.

In the form shown in Figs. 1 to 4, inclusive, 10 is a cylindrical hub, preferably made from a solid bar, having adjacent its opposite ends, wheel spoke flanges 10a, and having intermediate said flanges an oil drain opening 10b normally closed by the usual removable plug (not shown). The inner, left-hand end of the hub is machined to form a bearing race 10c in which run balls 11 carried by a suitable race formed in a brake anchor 12 threaded onto the usual axle 13. The outer end of the anchor is reduced to provide a flattened hub portion 12a on which is mounted a torque arm 14 adapted to be secured to the bicycle frame in the usual manner whereby any force tending to rotate the anchor is transferred to said frame through arm 14. The inner end of anchor 12 is provided with annularly disposed teeth 12b for a purpose to be described hereafter. Preferably a dust cap 15 covers the end of the hub adjacent bearing 11, said cap being held on anchor portion 12a by arm 14 which is retained in position by a suitable lock nut 15a.

Threaded on the opposite end of the axle is a cone 16 provided with a bearing race 16a to receive balls 17 that roll on a race formed on the inner surface of the enlarged head 18a of an elongated driving sleeve 18. Interposed between said elongated head and the adjacent inner end of hub 10 is a ball bearing 19 whereby sleeve 18 is rotatably mounted on the axle but without direct engagement with the axle. A flange 18b on sleeve head 18a constitutes a dust cap for bearing 19 and adjacent said flange is a sprocket wheel 20 that is threaded on the outer surface of the enlarged sleeve head, said sprocket wheel being held in position by a suitable lock nut 21. The sprocket wheel 20 is adapted to be driven by a sprocket chain, not shown, in a manner well understood in the art.

The inner end of sleeve 18 is exteriorly threaded to receive an interiorly threaded nut 22 which carries a pair of diamond shaped, diametrically disposed wedges 23 which are preferably formed integral with the nut. Each wedge member 23 is, in effect, a double wedge member the angularly disposed surface at the right hand end thereof, as viewed in Fig. 3, being formed on an angle which is greater than that employed in forming the angularly disposed surface at the left hand end, for a purpose to be explained more fully hereafter.

In one embodiment of the invention the included angle employed for the edges of the surface at the right hand end of the wedge was 50° while the included angle for the left hand end of the wedge was 34°. It will be understood, however, that these specific angles need not be employed and in certain cases it may be desirable to make the angle at the left hand end of the wedge as small as 25° but this angle must not be so small as to effect self locking of the parts, as will be referred to more fully hereafter. The angle at the right hand end of the wedge must be sufficiently large to prevent the end of the wedge from abutting against the adjacent end of the hub during its longitudinal movement to the right, as will be pointed out hereafter, and this angle must be sufficiently large to take care of normal wear of the clutch and brake shoes.

Loosely mounted on nut 22 are a pair of semicircular brake shoes 24 which are preferably formed of a non-ferrous material which will not gall. It has been found that "muntzmetal," or manganese or other bronzes are suitable metals from which to form the brake shoes, the metal selected being such as to readily radiate heat. The side edges of each shoe are cut or formed irregularly, as is shown in Fig. 3, wherein the right hand straight portion of the edge of the shoe joins two angularly disposed portions that follow the configuration of wedge 23 and then an irregular line to a shoulder 24a formed for a purpose to be described hereafter.

Preferably, the outer central surface of each shoe is cut away as at 24b to provide a relatively wide oil groove which extends the entire length of the shoe. The right hand end of each shoe is also preferably notched, as at 24c, and when desired one or more angular oil grooves 24d may be provided between oil groove 24b and the adjacent edge of the shoe. Preferably grooves 24d extend throughout the length of the shoe.

An expander 25 comprising a ring having teeth 26 formed on the lateral face thereof for engagement with teeth 12b on anchor 12, and having a pair of diametrically disposed wedges 27 is loosely positioned between the left hand ends, as viewed in Fig. 1, of shoes 24. The outer diameter of the ring is substantially equal to that of the inner diameter of the shoes and the outer faces of wedges 27 lie substantially flush with the outer faces of the shoes when said shoes are not in clutching or braking engagement with the hub.

Yielding means are provided for resisting movement of nut 22, and hence shoes 24, to the left as viewed in Figs. 1 to 3. In the form shown, said means comprise a bushing 28 threaded onto the left hand end of axle 13. Preferably this bushing, the outer surface of which for a portion of its length at least is preferably hexagonal, or otherwise provided with flat surfaces, should be assembled on the axle with anchor 12 to insure proper positioning of the parts. If desired, the right hand end of bushing 28 may be extended to form a support or bearing for the left hand end of driving sleeve 18. For this purpose the outer surface of the right hand end of the bushing is circular and preferably formed with one or more circumerential oil grooves. To simplify manufacture, the outer dimension of the right hand or bearing end of bushing 28 may be less than that of the remaining portion of the bushing, and at the junction of these two portions ears 28a may be pressed up by a suitable die to form shoulders for a washer 29 that is normally held in engagement with said shoulders by means of a coil spring 30 surrounding bushing 28 and abutting at one end against the washer, the opposite end of said spring abutting against the inner face of anchor 12. Washer 29 is sufficiently loose on the bushing to permit longitudinal movement thereon but said washer cannot rotate on the bushing due to the flat surfaces of the central opening in the washer engaging the flat surfaces on the bushing. The inner diameter of the bushing adjacent the right hand end thereof may be such that the inner surface of said bushing does not bear against axle 13.

In operation, driving torque imparted to sprocket wheel 20 rotates driving sleeve 18, and the threaded engagement between said sleeve and nut 22 and the drag of one or both of said loosely mounted shoes on the inner surface of the hub, cause the nut to move to the right relative to said sleeve. This movement is effective through the right hand ends of wedges 23 to move shoes 24 to the right until the right hand slotted ends thereof engage the adjacent inner surface of the hub and further movement of the nut and wedges is effective to move each shoe radially into clutching engagement with the inner cylindrical surface of the hub whereby a driving connection is established from the sprocket wheel to the hub to drive the rear wheel of the bicycle. Notches 24c coact with oil grooves 24b and 24d to break the oil film on the inner surface of the hub thereby quickly giving metal-to-metal contact and providing a positive clutching action. In the event that the clutching action is too abrupt, the size or length of the oil grooves may be decreased or one or more of said grooves may be omitted. No slippage takes place at this time between the hub and the clutch shoes 24.

If it is desired to free-wheel, the rider interrupts the transfer of torque to sprocket wheel 20 in the usual manner thereby holding driving sleeve 18 against rotation. Nut 22 now moves to the left relative to said sleeve, as viewed in Figs. 1 to 3, inclusive, until it abuts against washer 29. Spring 30 may be of such strength that the rider can feel the engagement of the nut with the washer. As soon as nut 22 begins its movement to the left relative to the driving sleeve the right hand ends of wedges 23 are no longer effective to force shoes 24 outwardly into engagement with the hub and, accordingly, the clutching action is interrupted. The left hand ends of wedges 23, due to the inclination thereof, move said shoes to the left so that the right hand ends of said shoes are disengaged from the hub and the parts occupy the position shown in Fig. 3. Since the shoes are loosely mounted on the nut and are not being driven, whereas the hub continues to rotate in free-wheeling, the lower shoe will drag under the influence of gravity on the inner, lower surface of the hub, but the weight of the shoe is so small that this does not interfere with the free-wheeling. If the nut 22 is stopped with wedges 23 in a position 90° from that shown in Fig. 3, then a portion of both shoes will drag on the bottom of the hub during free-wheeling.

If it is desired to apply the brake, the rider rotates the sprocket wheel in a direction opposite to that during normal pedaling, and since the shoe or shoes 24 are dragging on the rotating hub these shoes, together with nut 22, move to the left, as viewed in Figs. 1 to 3, relative to the driving sleeve. Washer 29 is moved to the left against the pressure of spring 30 by nut 22 and the shoes and expander 27 are moved to the left by the left hand ends of wedges 23, until teeth 26 of expander 27 are brought into full meshing engagement with the teeth 12b of anchor 12. The yielding washer effects "synchro-meshing" of the two sets of teeth 26 and 12b and the brake shoes are now positively locked against rotation due to the engagement of said shoes with expander wedges 27 and the engagement of the anchor and expander teeth, any braking torque being transmitted through shoes 24 to wedges 27, teeth 26, anchor 12, and arm 14 to the frame of the bicycle. Further movement of the sprocket wheel in the reverse direction causes wedges 23 and 27 to force the shoes 24 radially into engagement with the hub to obtain proper braking. At this time the parts occupy the position illustrated in Fig. 2, and the movement of the wedges and shoes is such that the left hand ends of wedges 27 are not in engagement with the adjacent sides of shoulders 24a on the shoes. Because of the large area of the surfaces of the shoes available for braking the generation of heat is low and the braking action is smooth and prompt. It is thus possible to employ a smaller diameter solid bar in forming the hub thereby reducing the expense of the structure and rendering the same more compact. When the pressure on the sprocket wheel is now released nut 22, expander 25 and shoes 24 move promptly to the right. Washer 29 and spring 30 assist in this action. However, if the angles of the surfaces at the left hand end of wedges 23 and of wedges 27 are properly selected the brake shoes will be released without the aid of the spring and washer.

In the embodiment illustrated the included angle of the inclined surfaces of wedges 27 is 44° but it will be understood that this angle may be varied and if it is kept small easy braking will result. The angle must not be so small, however, as to effect self-locking of the brake shoes. When the shoes are not in braking or clutching engagement wtih the hub the dragging of the shoe or shoes on the lower, inner surface of the hub gives a retarding action which insures relative movement between nut 22 and sleeve 18 to move said nut to braking position or to clutching position. The spring and washer insure against the retarding action of the dragging shoe or shoes from initiating braking when freewheeling is desired.

In the embodiment of the invention illustrated in Figs. 6 to 8, inclusive, the expander wedges 27 have been omitted. The nut 31 which is longitudinally movable, on the driving sleeve 32, is somewhat longer than nut 22 and it carries in its outer periphery a diamond-shaped wedge 33. The lateral edges of the shoes are cut away at one side to conform to the contour of the wedge but the remaining portions of said edges are rectilinear as are the opposite edges. Oil grooves, similar to those described above, may be provided in the outer surfaces of the shoes and preferably each shoe is provided, adjacent the left hand end thereof and centrally thereof, with an opening 34a through which project diametrically disposed ears 35 that are formed integrally with a toothed ring 36, the teeth being shown at 37 and being adapted for engagement with teeth 38 formed on the inner face of stationary anchor 39. Ring 36 thus constitutes a movable anchor member which must move right or left as the shoes are moved. The openings 34a are of such size that the shoes are loosely associated with the ring and are free to move into dragging engagement with the inner surface of hub 10.

As illustrated, the bushing 40 which carries washer 29 has not been extended to form a bearing for the inner end of driving sleeve 32 although this construction may be discarded for the construction of the bushing shown in Figs. 1 and 2, in the event it is considered that bearings 16a and 19 do not suitably support driving sleeve 32 and hold it against twisting movements. Instead of the circumferentially spaced shoulders 28a of Figs. 1 and 2, sleeve 40 may be provided with a flange 40a to hold washer 29 against the pressure of spring 41.

In view of the description given above of the functioning of the device a detailed description of this second embodiment of the invention is believed to be unnecessary. Edges 33a of the wedge are effective to move the shoes to the right to effect clutching engagement with the hub, and edges 33b are effective to move the shoes to the left to free-wheeling position, or farther to the left to engage teeth 37 with teeth 38 and to move said shoes radially into braking engagement with the inner surface of the hub. Washer 29 is engaged by nut 31 during free-wheeling at which time the lower shoe drags lightly on the inner surface of the bottom of the hub, or if the nut 31 is held against movement in a position 90° from that shown in Fig. 8, both shoes can drag on the bottom of the hub whereby retarding action is secured which will insure relative movement between nut 31 and driving sleeve 32 when it is desired to move the shoes to clutching or braking position. In Fig. 6 the parts are illustrated in clutching position.

There is thus provided a novel combined clutch, free-wheeling and brake mechanism for bicycles which is relatively inexpensive to manufacture, which is rugged, and which is adapted for long life. Instead of the use of springs, which have heretofore been employed for yieldingly retaining the brake shoes in inward or non-clutching position, which springs in certain instances render prior devices inoperative because they tend to prevent relative motion between the shoes and the nut, the shoes of the present invention are loosely mounted on the nut and also on the movable anchor member. In assembling the parts, the bushing and anchor should be mounted on the axle at the same time to accurately position the washer for engagement by the nut. This longitudinal positioning of the anchor, bushing and washer insures a small movement of the sprocket in going from clutching to coasting and braking positions. When properly adjusted, angular movement of the sprocket wheel in a reverse direction for a distance of approximately one tooth will suffice to move the parts from full clutching position to free-wheeling position.

While it is preferred to employ the yielding means shown for facilitating coasting the proper selection of the angles for the wedges, as pointed out above, renders it unnecessary to provide special means for moving the parts from braking position, the expander or movable anchor member of the first embodiment of the invention being pulled to the right by the shoes. The expander wedges coact with the wedges on the nut to insure proper braking engagement between the shoes and the inner surface of the hub. Preferably, the movable anchor of both embodiments is made of a ferrous metal rather than a non-ferrous metal as employed in the brake and clutch shoes.

While only two embodiments of the invention have been illustrated and described and the description has been specific to the use of the invention in a bicycle, it will now be understood by those skilled in the art that various changes may be made in the construction and arrangement of the parts and that the invention may be adapted for use in other fields where it is desired to employ a combined clutch and brake structure. Reference will be had accordingly to the appended claim for a definition of the limits of the invention.

What is claimed is:

In a bicycle brake and clutch mechanism of the type described wherein a wedge carrying nut mounted on a driving sleeve is adapted to move shoes into braking or clutching engagement with the interior of the wheel hub, yielding means for resisting movement of said nut and shoes in one direction comprising a bushing, a washer slidably and non-rotatably mounted on the bushing and adapted to be engaged by said nut, and a spring for yieldingly holding said washer in a predetermined position on the bushing with respect to said nut.

WILLIAM F. ERRIG.
EDWARD S. DE HART.

REFERENCES CITED

The following references are of record in the file of this patent:

UNITED STATES PATENTS

| Number | Name | Date |
|---|---|---|
| 906,149 | Morrow | Dec. 8, 1908 |
| 1,102,402 | Gubelman | July 7, 1914 |
| 1,118,889 | Carter | Nov. 24, 1914 |
| 1,139,145 | Van Deren | May 11, 1915 |
| 1,648,421 | Olsen | Nov. 8, 1927 |
| 1,898,310 | Peterson | Feb. 21, 1933 |
| 2,131,532 | Christian | Sept. 27, 1938 |
| 2,149,324 | Wales | Mar. 7, 1939 |
| 2,191,460 | Fisher | Feb. 27, 1940 |
| 2,215,965 | Kurzina | Sept. 24, 1940 |
| 2,286,986 | Hood | June 16, 1942 |
| 2,314,845 | Kurzina | Mar. 23, 1943 |
| 2,445,616 | Hood | July 20, 1948 |